(No Model.)

H. KIESSLING.
DOOR HINGE.

No. 591,847. Patented Oct. 19, 1897.

Witnesses:
A. D. Horn
John Lutz

Inventor:
Hermann Kiessling
By Hermann Bormann
Att'y.

THE NORRIS PETERS CO., PHOTO-LITHO., WASHINGTON, D. C.

UNITED STATES PATENT OFFICE.

HERMANN KIESSLING, OF LEIPSIC, GERMANY.

DOOR-HINGE.

SPECIFICATION forming part of Letters Patent No. 591,847, dated October 19, 1897.

Application filed April 7, 1897. Serial No. 631,185. (No model.)

*To all whom it may concern:*

Be it known that I, HERMANN KIESSLING, a subject of the King of Saxony, residing at Leipsic, Germany, have invented a new and useful Improvement in Door-Hinges, of which the following is a specification.

My invention relates to door-hinges, and more particularly to devices connected therewith which allow of a ready lubrication without detaching the two or more parts constituting a hinge, or, in other words, lifting a door from its hinges.

In my improved hinge provision is also made to prevent dust and air from entering between the working ports of the hinge, so that the oil or other lubricant is maintained at all times in good condition.

Figure 1:
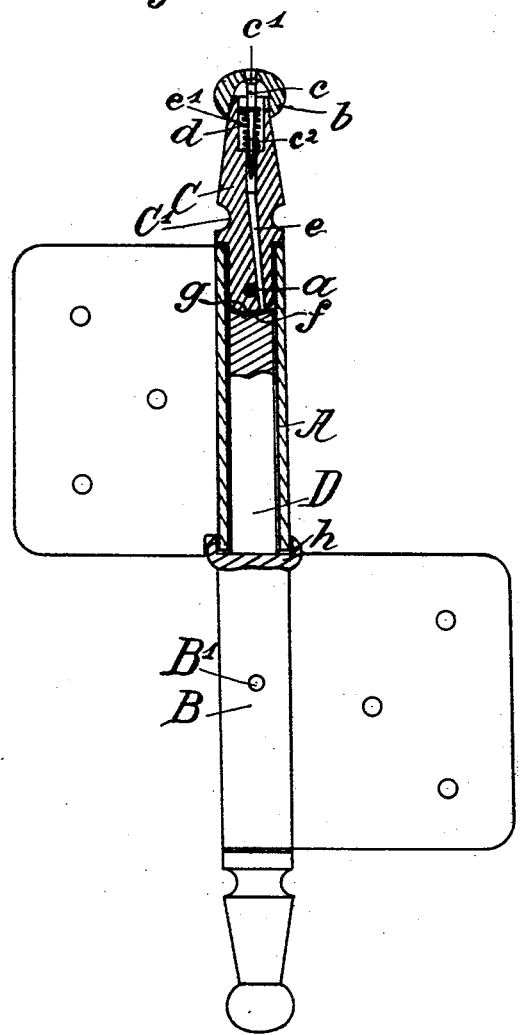
Figure 2:
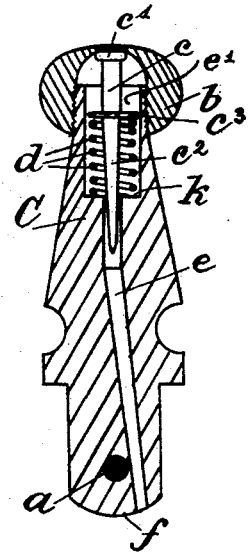
Figure 3:
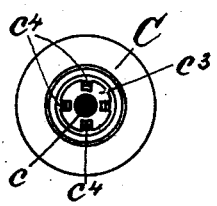

In the accompanying drawings, forming part of this specification, Figure 1 is an elevation, partly in section, of my improved hinge. Fig. 2 is a section, on a larger scale, of the upper plug, on which the means for lubricating are provided; and Fig. 3 is a top view of the upper plug, having its cap shown in Fig. 2 removed.

Referring now to the drawings for a further description of my invention, A and B are the leaves or the upper and lower parts of a hinge, of which the leaf B holds the pintle D by means of the pin B'. The lower leaf B is provided with an annular rim $h$, in which the lower cylindrical part of the leaf A is incased to form a retainer for the oil or lubricant, which may run down the pintle D. The latter is provided with a concave extremity $f$, with which the convex end of the plug C, secured to the upper leaf A by means of the pin $a$, engages. The convex end $g$ may be made of a smaller radius than the concave extremity $f$ to diminish friction between the working faces or contact ends $g$ and $f$. To enhance the lubrication of the contact ends $g$ and $f$, the plug C is bored at an angle to its axis its entire length, as shown at $e$, Figs. 1 and 2, to, first, conduct the lubricant near the outer edge of the cup-shaped extremity $g$ of the pintle D, and, secondly, to permit the fastening-pin $a$ to pass through the leaf A and plug C. The upper end of this bore $e$ is enlarged, as at $e'$, to form a shoulder $k$ and to contain a spring $d$. A cap $b$, having an orifice with valve-seat in its crown, is screwed to the upper end of the plug C to tightly close the bore $e\ e'$. Inside the bore is located a valve-stem $c$, having the valve $c'$ and disk $c^3$ for guiding the said stem. Notches $c^4$ are provided in the disk $c^3$ to admit the oil into the bore. The valve $c'$ is normally pressed into its seat in the crown of the cap $b$ by the spring $d$, inserted between the shoulder $k$ and disk $c^3$.

To lubricate my improved hinge, the pointed end of an oil-can is brought into the orifice in the crown of the cap $b$ and the valve $c'$ is depressed, after which oil may be admitted into the central bore $e\ e'$. By removing the oil-can the spring $d$ forces the valve $c'$ in its place and closes the orifice, preventing any dust or other foreign matter from entering into or mixing with the lubricant.

Having thus described the nature and objects of my invention, what I claim as new, and desire to secure by Letters Patent, is—

1. In a hinge composed of two leaves, a pintle secured to the lower leaf and having a concave extremity, a plug secured to the other leaf and having a corresponding convex extremity and an angularly-disposed bore, a cap secured on top of said plug and having an orifice and valve-seat in the crown thereof, a valve having its stem guided in said bore and means for normally maintaining the said valve in the seat of the cap, substantially as and for the purposes set forth.

2. In a hinge composed of two leaves, a pintle secured to the lower leaf and having a concave extremity, a plug secured to the other leaf and having a corresponding convex extremity and an angularly-disposed bore having an enlargement to form a shoulder, a cap screwed on top of said plug and having an orifice and valve-seat in the crown thereof, a valve having its stem provided with a disk, and a spring between said shoulder and disk to maintain the valve in the seat of the cap, substantially as and for the purposes set forth.

In testimony whereof I have signed my name to this specification in the presence of two subscribing witnesses.

HERMANN KIESSLING.

Witnesses:
CARL EIFLER,
RUDOLPH FRICKE.